United States Patent Office 3,190,722
Patented June 22, 1965

3,190,722
METHOD OF REMOVING IRON FROM SODIUM AND POTASSIUM SULFATES
Wilbur Simon, Crystal Lake, Ill., assignor to Morton Salt Company, Chicago, Ill., a corporation of Delaware
No Drawing. Filed Feb. 23, 1962, Ser. No. 175,361
13 Claims. (Cl. 23—121)

This invention relates to improvements in the production of alkali metal sulfates, and more particularly to a process for upgrading crude alkali metal sulfates, such as those of the Hargreaves and Mannheim processes.

Alkali metal sulfates are utilized for a variety of purposes in the chemical industries. For example, sodium sulfate or salt cake, as it is often termed, is used in the ceramic or glass making industries, which requires a product of very low iron content. The kraft paper industry requires a sodium sulfate that has a light or white color.

One important process for the production of alkali metal sulfates is the well known Hargreaves process. This process involves passing sulfur dioxide, water vapor, and oxygen gases at elevated temperatures, through alkali metal chlorides that have been briquetted with a small amount of iron catalyst. Although this process is successful, it produces a product which has several disadvantages. One disadvantage is the inclusion of iron as an impurity which causes a pink to red coloration. Another drawback is that the material tends to become "dusty" after grinding. Alkali metal sulfates produced by the Mannheim process have similar undesirable properties.

The crude alkali metal sulfates as are produced by the Hargreaves and Mannheim processes contain iron compounds which are commonly present in amounts of from 0.3 to 0.5 percent or higher iron expressed as $Fe_2O_3$. The entrained iron, usually present as iron oxide, contributes a pink to red color to the salt cake, which detracts from its salability where a white product is desired. Furthermore, grinding of the salt cake from the Hargreaves and Mannheim processes yields a product which has a high proportion of "dust," which is material of such fineness that a large proportion of the product passes through a 325 mesh screen. The presence of an inordinate amount of such fine particle size matter poses problems in packing, handling, processing and manufacturing relative to the health of personnel and also with respect to plant cleanliness, such that considerable inconvenience and expense are incurred in the use of such material.

Inasmuch as the crude alkali metal sulfate products, such as those of Hargreaves and Mannheim, contain undesirable impurities as outlined in the foregoing discussion, it would be desirable to provide a method of upgrading and improving such materials.

Accordingly it is one object of the present invention to provide a process for upgrading crude alkali metal sulfates produced by the Hargreaves and Mannheim processes by the removal of iron compounds therefrom.

A further object is the provision of a process for upgrading crude alkali metal sulfates wherein the resulting product has a reduced iron content, and is essentially white in color.

A still further object is the provision of a process for upgrading crude alkali metal sulfates wherein the product is relatively free of fine dust-like particles, and has a more desirable particle size distribution.

The fulfillment of these and other objects of this invention may be more readily appreciated by reference to the following specification, examples and appended claims.

Accordingly, in one broad form, the present invention comprises a process for producing alkali metal sulfate of reduced iron content and improved color by fusing a crude alkali metal sulfate, containing iron compounds as an impurity, with an alkaline material, cooling the fused admixture to a solid state, comminuting the resulting solid product, and magnetically separating magnetic iron compounds from the resulting pulverulent mass.

The process of the present invention is applicable to crude alkali metal sulfates of the type previously described, such as those of the Hargreaves and Mannheim processes, and more particularly to sodium and potassium sulfates.

The sulfates produced by these or other equivalent prior methods, which may be upgraded by the process of this invention, may contain iron compounds in amounts of from about 0.2 to about 3 weight percent, although from 0.3 to 0.5 weight percent is more common. The weight percent of iron is calculated on the basis of $Fe_2O_3$, or ferric oxide. The product is usually pink in color, although the color can range, depending upon the proportion of ferric oxide, from red to yellowish-orange.

The alkaline materials utilized in this process are broadly those derived from alkali metals or alkaline earth metals. Preferably these alkaline materials are in the form of hydroxides, oxides or carbonates. Exemplary of these materials are sodium hydroxide, sodium carbonate, sodium oxide, potassium hydroxide, potassium carbonate, calcium oxide, calcium hydroxide, and calcium carbonate.

The quantity of alkaline material used in the process of this invention may range from about 0.4 to 2 percent, although in the most preferred aspects the amount is from about 0.5 to 1.0 percent.

The process is carried out by fusion of the crude alkali metal sulfate in admixture with the alkaline material in a suitable fusion chamber. Such chambers may be in the form of crucibles, such as porcelain or other ceramic crucibles, fused quartz or metal.

The crude admixture fuses at temperatures in the range of 1650 to 2200° F., although usually fusion is ordinarily complete at about 1800° F. It should be understood that the process is not limited to any particular fusion temperature, the particular object being accomplished when the product is in a liquefied condition.

After the fusion of the alkali metal sulfate, containing iron compounds, with the alkaline material, a small quantity of iron compounds, usually in the form of red iron oxide, floats to the surface of the fused admixture and may be removed by skimming, or equivalent technique. The remaining iron impurities are principally in the form of magnetic iron oxide or black iron oxide dispersed throughout the fused product. These magnetic iron compounds are removed by means of a magnetic field after the fused product is cooled and comminuted. Generally any of a broad variety of magnetic separators may be used to carry out this particular step. The solid product may be comminuted or pulverized by grinding, or a similar equivalent technique.

For a more complete understanding of the process of this invention, reference is made to the following specific examples:

EXAMPLE 1

One hundred grams of a crude, pink salt cake (sodium sulfate) from the Hargreaves process, containing 0.40 percent of an iron compound expressed as $Fe_2O_3$, were fused with 1.0 gram of sodium carbonate in a porcelain crucible at 1800° F., until a liquid was formed. The small quantity of red iron oxide which floated on top of the melt was removed by skimming. The fused salt cake was decantered, cooled and ground to a particle size of about 60 to 200 mesh. The ground material, now white in color, was passed through a magnetic separator to remove iron oxide, and then analyzed for iron content. For purposes of comparison, the same procedure was followed, using crude salt cake from the same source, but without addition of sodium carbonate. This too was analyzed for iron content at the conclusion of the process.

The following is a comparison of the starting material and final product:

| Sample | Iron Content (Calculated as Fe₂O₃) percent by weight | | Additive | Amount of Additive, grams | Color |
|---|---|---|---|---|---|
| | Initial | Final | | | |
| Crude Salt Cake | 0.40 | 0.20 | None | None | Pink. |
| Do | 0.40 | 0.02 | Sodium Carbonate. | 1.0 | White. |

EXAMPLE 2

One hundred grams of crude, pink-colored salt cake from the Hargreaves process containing 0.40 percent iron expressed as $Fe_2O_3$ were fused with 0.75 gram of sodium carbonate in a porcelain crucible at a temperature of 1800° F., until a liquid was formed. Iron oxides were removed by the same procedure as explained in Example 1, and an analysis of iron content was conducted on the cooled, ground, purified salt cake, which was now white in color.

The following is a comparison of the starting material and final product:

| Sample | Iron Content (Calculated as Fe₂O₃) percent by weight | | Additive | Amount of Additive, grams | Color |
|---|---|---|---|---|---|
| | Initial | Final | | | |
| Crude Salt Cake | 0.40 | 0.20 | None | None | Pink. |
| Do | 0.40 | 0.08 | Na₂CO₃ | 0.75 | White. |

EXAMPLE 3

One hundred grams of crude, pink salt cake containing 0.34 percent iron expressed as $Fe_2O_3$ were fused with 1.0 gram of sodium hydroxide in a porcelain crucible at a temperature of 1800° F. The red iron oxide which floated on top of the melt was removed by skimming. The black magnetic iron oxide particles were removed from the product after solidification and grinding. The ground material was then analyzed for iron content. For control purposes, the same procedure was followed, using the same crude salt cake, but omitting the sodium hydroxide.

The following is a comparison of the starting material and final product which was now white in color:

| Sample | Iron Content (Calculated as Fe₂O₃) percent by weight | | Additive | Amount of Additive, grams | Color |
|---|---|---|---|---|---|
| | Initial | Final | | | |
| Crude Salt Cake | 0.34 | 0.20 | None | None | Pink. |
| Do | 0.34 | 0.03 | NaOH | 0.5 | White. |

EXAMPLE 4

One hundred grams of pink crude salt cake containing 0.34 percent iron expressed as $Fe_2O_3$ were fused with a mixture of 0.5 gram of sodium carbonate and 0.5 gram of calcium oxide in a porcelain crucible at a temperature of 1800° F. until a liquid was formed. The salt cake was separated from red and black oxides of iron as described in the preceding examples. The ground product was analyzed for iron content. A control was put through the same process.

The following is a comparison of the starting material and final product which was now white in color:

| Sample | Iron Content (Calculated as Fe₂O₃) percent by weight | | Additive | Amount of Additive, grams | Color |
|---|---|---|---|---|---|
| | Initial | Final | | | |
| Crude Salt Cake | 0.34 | 0.20 | None | None | Pink. |
| Do | 0.34 | 0.04 | Na₂CO₃ / CaO | 0.5 / 0.5 | White. |

The product produced by the process of this invention has a typical particle size distribution, as indicated in the following table. To illustrate the decrease in fines or dust the particle size distribution of the original crude crushed salt cake ground by the same technique is also given.

*Effect of fusion on particle size*

Particle size distribution, crude salt cake:

|  | Percent |
|---|---|
| Retained on—40 mesh | 11.0 |
| 60 mesh | 10.04 |
| 80 mesh | 6.8 |
| 100 mesh | 4.5 |
| 200 mesh | 15.5 |
| 325 mesh | 16.4 |
| Through 325 mesh | 35.1 |

Particle size distribution, salt cake ungraded by fusion:

|  | Percent |
|---|---|
| Retained on—40 mesh | 0.04 |
| 60 mesh | 0.04 |
| 80 mesh | 0.04 |
| 100 mesh | 7.3 |
| 200 mesh | 78.0 |
| 325 mesh | 16.8 |
| Through 325 mesh | 5.7 |

From the above it may be seen that the product of the present invention has a considerably improved particle size distribution, and particularly has a lower fines content as indicated by the much lower amount of material passing through a 325 mesh screen (U.S. standard screen scale). It should be particularly noted that about 85.42 percent of the product is retained on a 200 mesh screen, whereas in the crude salt cake only 47.84 percent is retained on a 200 mesh screen.

The foregoing examples illustrate that the process of this invention applied to crude alkali metal sulfates from the Hargreaves or Mannheim process results in a product which has a substantially reduced iron content and an improved color. For example, the iron content in the crude product is reduced from 80 to 95 percent of its original value. Similar results were obtained on crude potassium sulfates containing iron impurities.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for producing a sodium sulfate of reduced iron content and improved color which comprises fusing a crude sodium sulfate containing from 0.2 to 3 percent iron calculated as ferric oxide with an alkaline material selected from the group consisting of alkali and alkaline earth metal oxides, hydroxides and carbonates, removing ferric oxide from the surface of the fused admixture, cooling the fused sulfate to a solid state, comminuting said solid sodium sulfate product, and magnetically separating magnetic iron oxide particles formed in said process from the resulting pulverulent mass.

2. The process of claim 1 wherein the alkaline material is utilized in an amount of from 0.4 to 2 percent.

3. The process of claim 1 wherein the iron is present in the crude sulfate in an amount of from 0.3 to 0.5 percent by weight calculated as ferric oxide.

4. The process of claim 1 wherein the alkaline material is sodium hydroxide.

5. The process of claim 1 wherein the alkaline material is sodium carbonate.

6. The process of claim 1 wherein the fusion is carried out at temperatures of from 1625 to 2200° F.

7. A process comprising fusing a crude sulfate, selected from the group consisting of sodium and potassium sulfates containing from about 0.2 to about 3 weight percent of iron compounds calculated as ferric oxide, with an alkaline material selected from the group consisting of alkali and alkaline earth metal oxides, hydroxides, and carbonates, removing iron compounds floating on the surface of the fused crude sulfate, cooling the fused sulfate to a solid state, comminuting said solid product, and magnetically separating magnetic iron oxide formed in said process from the resulting pulverulent mass.

8. The process of claim 7 wherein the alkaline material is utilized in an amount of from 0.4 to 2% by weight of the crude sulfate.

9. The process of claim 7 wherein the alkaline material is sodium carbonate.

10. The process of claim 7 wherein the alkaline material is sodium hydroxide.

11. The process of claim 7 wherein the alkaline material is calcium carbonate.

12. The process of claim 7 wherein the alkali metal sulfate is sodium sulfate.

13. The process of claim 7 wherein the fusion is carried out at a temperature of from 1625° F. to 2200° F.

References Cited by the Examiner
UNITED STATES PATENTS

| | | | |
|---|---|---|---|
| 2,448,882 | 9/48 | Greffe | 209—2.5 |
| 2,860,951 | 11/58 | Cunningham | 23—121 X |
| 3,006,726 | 10/61 | Simon | 23—121 |

MAURICE A. BRINDISI, *Primary Examiner.*

UNITED STATES PATENT OFFICE
CERTIFICATE OF CORRECTION

Patent No. 3,190,722  June 22, 196(

Wilbur Simon

It is hereby certified that error appears in the above numbered patent requiring correction and that the said Letters Patent should read as corrected below.

Column 2, line 67, for "decantered" read -- decanted --; line 70, after "remove" insert -- magnetic --; column 4, line ? for "ungraded" read -- upgraded --; line 43, after "as" insert -- is --.

Signed and sealed this 16th day of November 1965.

(SEAL)
Attest:

ERNEST W. SWIDER
Attesting Officer

EDWARD J. BRENNER
Commissioner of Patents